No. 802,093.　　　　　　　　　　　　PATENTED OCT. 17, 1905.
E. BAUCO.
SYSTEM OF OVERHEAD ELECTRIC CONDUCTION FOR VEHICLES.
APPLICATION FILED AUG. 20, 1902.
2 SHEETS—SHEET 1.
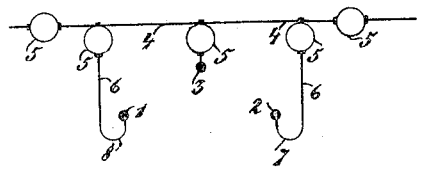
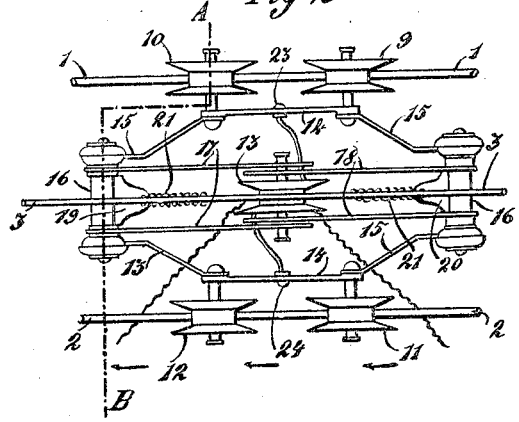
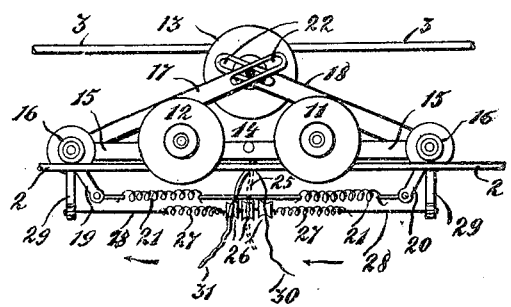
Witnesses
John Potach
Albert L. Smith
Inventor
Ettore Bauco
By ⸻
Att'y.

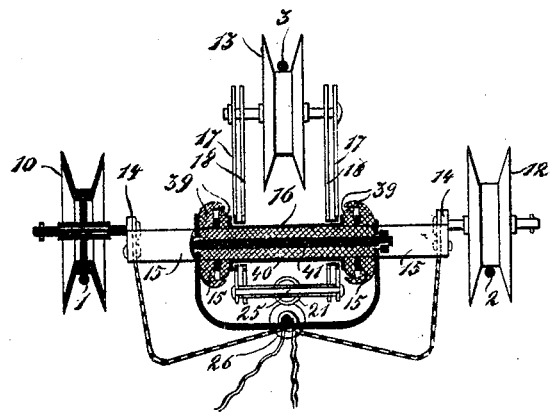

UNITED STATES PATENT OFFICE.

ETTORE BAUCO, OF ROME, ITALY.

SYSTEM OF OVERHEAD ELECTRIC CONDUCTION FOR VEHICLES.

No. 802,093.     Specification of Letters Patent.     Patented Oct. 17, 1905.

Application filed August 20, 1902. Serial No. 120,280.

*To all whom it may concern:*

Be it known that I, ETTORE BAUCO, a subject of the King of Italy, residing at Rome, Italy, have invented a new and useful Improvement in Systems of Overhead Electric Conduction for Vehicles; and I do hereby declare the following to be a full, clear, and exact description of the same.

My invention relates to improvements in systems of overhead electric conduction characterized by a trolley which is suspended from the current-supply wires, being at the same time in communication with the electric motor on the vehicle, which may be a car on rails, a carriage on the road, a vessel in a canal or river, and generally any other vehicle.

The overhead system consists of three parallel tightly-stretched aerial wires, two of which are on the same level and the third one is placed a little above and in the middle plane of them. The trolley in the shape of a small car is provided with five sheaves, of which four rest upon the two lower wires and support the weight of the trolley and the fifth is pushed upward by means of springs against the third wire, so that the trolley is always inclosed within the three above-named overhead wires. The supporting-sheaves also serve as means for collecting current from the wires. The trolley is drawn along the wires by means of flexible connections with the traveling vehicle, which connections may consist of the supply-wires, but are preferably formed of spiral springs upon which are festooned the supply-wires.

In order to better understand the details of the various parts of my system, reference is directed to the accompanying drawings, wherein the figures show schematically a practical application of the said system, in which—

Figure 1 represents a cross-bar for supporting the line-wires, the said wires being shown in section. Figs. 2 and 3 represent, respectively, a top view and a side view of the trolley and line-wires. Fig. 4 is an enlarged section on the line A B of Fig. 2. Figs. 5 and 6 are a side view and an end view of an electromobile, which may consist of a vehicle traveling on an ordinary road without rails; and Fig. 7 is a detail of the traction-springs and supported supply-wires festooned thereon.

The overhead fixture consists of the three aerial wires 1, 2, and 3, which may wholly or partially serve for the electric circuit. Such wires are supported at suitable intervals by means of bearers, which consist of brackets fixed to the walls of adjacent buildings or of cross-bars fitted to posts placed along the road or supported by means of suitable wires from adjacent buildings or poles. This latter application is represented in Fig. 1, wherein it is shown that suitable insulating-bodies 5, arranged on the cross-bar 4, keep the three wires electrically separated from each other. The two lower wires are fastened at the ends of the hooks 7 and 8 on the rods 6, which latter are insulated from the cross-bars, as shown.

The trolley, Figs. 2, 3, and 4, consists of five sheaves 9, 10, 11, 12, and 13, four of which rest two by two on the two lower wires and the fifth one is held upward against the upper wire. The two sheaves resting on one wire are insulated from the other two resting on the other wire, and the upper sheave is insulated from all the four lower sheaves. The four lower sheaves are connected by a frame of polygonal form, consisting of two longitudinal bars 14, diagonal arms 15, and the spindles of the insulated couplings 16. On the frame are mounted the four axles of the lower sheaves 9, 10, 11, and 12.

On the central part of the spindle which connects the two parts of the frame are situated two forks 17 and 18, connected, respectively, to the arms 19 and 20, Figs. 2 and 3. These forks are insulated from the frame and are arranged so as to rotate in vertical planes and are normally elevated by two connected horizontal spiral springs 21, the elasticity of which will tend to push the fork-arms upward, Fig. 3. The four fork-arms 17 18 are provided with slots 22 where they cross each other, so as to support the axle of the upper sheave 13. The latter is supported within the slots which permit the fork-arms to be elevated or depressed and still serve as a support for the sheave 13. Owing to the continuous action of the spiral springs 21 the trolley remains continuously secured between the three wires, and the sheaves cannot leave them in any way. For further safety the sheaves are furnished with broad flanges and deep grooves, which prevents them from being accidentally displaced.

Of the three wires for the passage of the current to the electromobile one branches out from the terminal 23, situated on one side of the frame, one from the terminal 24, situated on the other side, and the third from the rod 25, which connects the two spiral springs 21. These wires are connected to three sheave-shaped insulators 26, which are strung between two spiral springs 27, which connect the two traction-rods 28. These latter are suspended from two stationary uprights 29, entirely insulated from the frame 15, and arms 17 and 19. The mechanism for the transmission of the energy to the electromobile branches out from the insulators 26. It is preferred in connection with direct currents to unite two of the wires to form one single wire 30, Figs. 3 and 5, while the other wire will connect alone with the wire 31. The metal sheaves 9 and 10, Figs. 2 and 4, which rest on the wire 1, as well as their axles and supports 14 and 15, form an electrical continuity as far as the coupling-box 16, with which, however, they do not communicate, as the ends of the bars 15 are separated from said coupling-box 16 and from the metal axle 41 by the insulating-disks 39 and insulating-cylinder 40. The same may be said with regard to the sheaves 11 and 12. The sheave 13 and the wire 3 communicate with the coupling-box 16 on the rod 25, but are insulated from the other parts above referred to. The wires which connect the trolley to the electromobile serve for the purpose of driving the trolley, as well as for transmitting the energy to the motor on the vehicle.

In order to hold the trolley firmly in its place with relation to the vehicle and to prevent sagging as much as possible and also to prevent injury to the line, it is necessary that the connecting device be both flexible and elastic. To this end the wire 31 and, if desired, also the wire 30, Figs. 5 and 6, may be in the shape of festoons 33, hung to the spiral springs 32, Fig. 7, which should be capable of sufficient elongation under a determined traction strain. Each spiral spring 32, with the proper conducting-wire 33, branches out from the trolley 34 and is connected at the end 36 to an insulating-rod 35. A wire connected in any suitable way completes the circuit to the machinery of the electromobile. For the purpose of reducing weight and to cover the electrical connections the rods 35 may be hollow. The other wire 30 is connected similarly to the rear part of the electromobile at the end 38 to the rod 37. The two rods 35 and 37 may be put very easily in place and may be removed and shifted when necessary.

From the before-described arrangement it follows that during the traveling of the electromobile the latter exerts a certain amount of tractive force for dragging the trolley. Such strain is transmitted from the end 36 of the rod 35 to the trolley 34 by means of the spiral spring 32, which expands sufficiently far to permit the trolley to follow the movement of the electromobile. The wire 30 is operated like the wire 31, but as it is connected to the rear of the electromobile it extends or shortens in the contrary direction, and should the trolley in the descents or on the stoppages of the electromobile run too rapidly such wire will restrain it, acting as a brake. When the electromobile turns around for traveling in the reverse direction, the wires will be crossed. They may be restored to their normal position by changing the position of the respective rods. Further, it will be seen that owing to the form of the overhead line and the connections with the trolley it acts as a continuous brake, and owing also to the spiral spring which drags the trolley and acts as a compensator the traveling motion of the trolley tends to remain uniform and regular.

It is of course understood that in lieu of the electromobile described and illustrated a car on a track, a carriage on an ordinary road, a vessel on a canal or river, or any form of moving device propelled by electricity collected from aerial wires may be substituted without departing from the spirit of the invention.

I claim—

1. In a system of electric conduction, a trolley having a frame, supporting-sheaves therefor, a guide-sheave, pivoted arms therefor, depending arms connected with the supporting-arms, and a single spring connecting the arms for forcing the guiding-sheave upward.

2. In a system of electric conduction, the combination of longitudinal members carrying supporting-sheaves, insulating connections for the longitudinal members forming a frame, a guide-sheave supported from arms pivoted to the insulating connections, and depending arms and spring connections for elevating the guide-sheave.

3. In a system of electric conduction, the combination with a line-wire and vehicle, of a suspended trolley and a conducting-wire, the said wire being supported at intervals from a spiral spring which connects the trolley and vehicle.

4. A system of overhead conduction for vehicles propelled electrically, consisting of three aerial wires suitably stretched, two of which are on the same level and the third one arranged a little above and in the vertical middle plane of the other two, and a trolley provided with five sheaves which act as means of contact and derivation of current, said sheaves being provided with broad flanges and deep grooves, four of them resting, two by two, on the lower wires, while the fifth one is pushed upward by means of levers and springs against the upper wires, auxiliary conducting-wires arranged in the shape of festoons and hung from a spiral spring, so that such auxiliary wires may extend or shorten with respect to the vehicle with regard to the overhead wires, which auxiliary wires communicate with rods situated upon the electromobile and connected with the motor thereon.

In testimony whereof I have signed this specification in the presence of two subscribing witnesses.

ETTORE BAUCO.

Witnesses:
   A. RAGG,
   RENATO SEEVOLA.